United States Patent Office 2,921,942
Patented Jan. 19, 1960

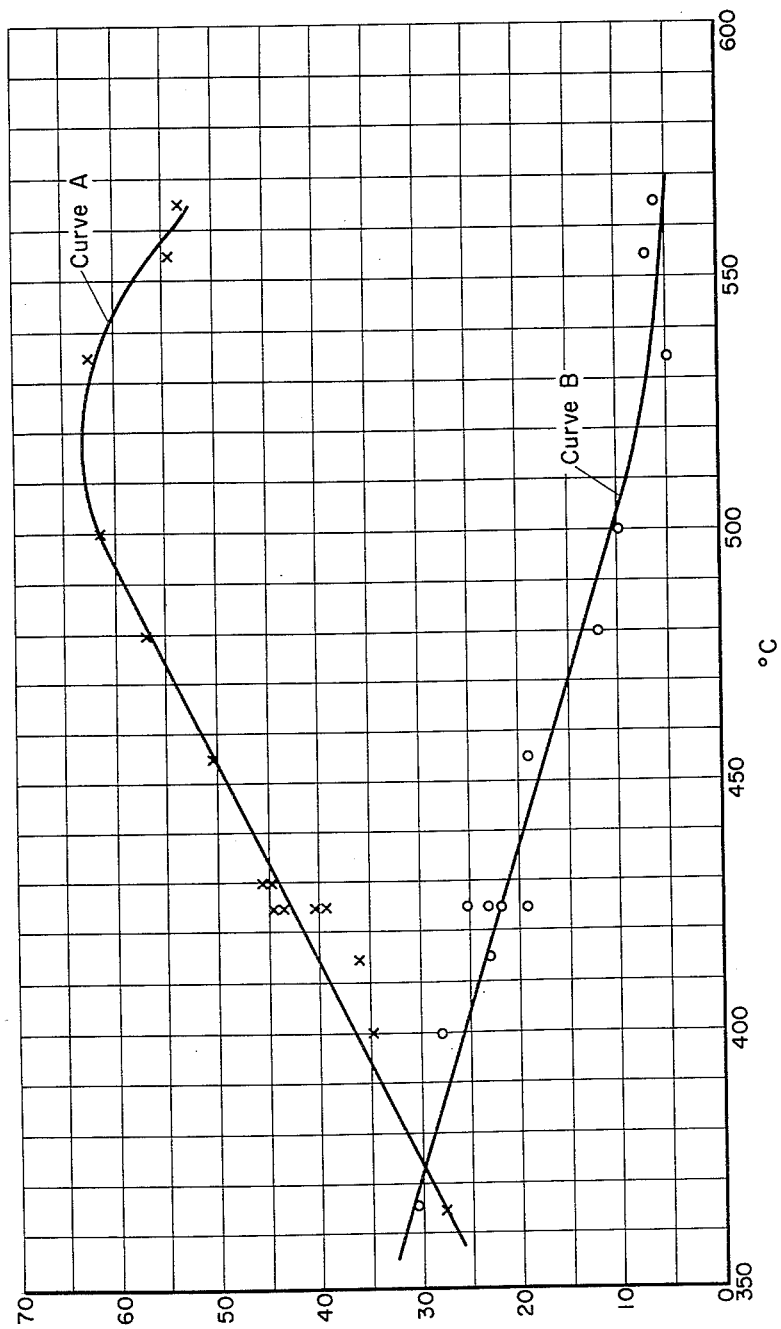

2,921,942

SYNTHESIS OF CARBAZOLE

Henry M. Grotta, Delaware, Ohio, assignor, by mesne assignments to American-Marietta Company, Chicago, Ill., a corporation of Illinois Application July 12, 1956, Serial No. 597,371

5 Claims. (Cl. 260—315)

This invention relates to a process of preparing carbazole. More particularly, this invention relates to the synthesis of carbazole by catalytic cyclodehydrogenation of diphenylamine in the vapor phase.

At present the principal source of carbazole is anthracene wastes from which the carbazole is isolated. It is known also that carbazole can be synthesized from such compounds as orthonitrobiphenyl, orthoaminobiphenyl and mixtures of these compounds in the presence of various types of catalysts. Examples of such catalysts are vanadium oxide, aluminum oxide, chromium oxide, molybdenum oxide, manganese oxide, cupric oxide, and tungsten oxide. In addition, carbazole has been prepared from diphenylamine in the presence of platinized charcoal catalysts. Syntheses by means of these catalysts involve numerous disadvantages, the use of platinized charcoal being particularly objectionable because of its short catalyst life and its inability to be regenerated after use. None of these processes for synthesizing carbazole is known to provide a suitable supply of carbazole, even though there is a demand for a carbazole supply other than from the presently available anthracene wastes. The anthracene wastes from which carbazole presently is recovered is obtained from foreign sources. This, of course, is undesirable because of the uncertainties of foreign markets. Furthermore, the carbazole recovered from anthracene wastes is contaminated with impurities characteristically present in anthracene waste, which only can be removed, if at all, by difficult purification steps. In many processes using carbazole as a chemical intermediate, the impurities present in carbazole derived from anthracene wastes are tolerated only because of the impracticability of purifying the carbazole. In many uses of carbazole, for example in the manufacture of dyestuffs, it would be highly desirable and preferable to use pure carbazole, free from the usual anthracene waste impurities.

Applicant has discovered that it is possible to synthetically produce carbazole, free from undesirable anthracene waste impurities, by catalytically cyclodehydrogenating diphenylamine by means of catalysts, which can be regenerated, consisting of platinum or palladium supported on certain refractory materials which, by proper control of the operating conditions, will not deleteriously interfere with the cyclodehydrogenation reaction. The catalysts found useful for this purpose are catalysts of platinum or palladium supported on silica, alumina, or mixtures of silica and alumina. The preferred catalyst of this group is platinum supported on porous high-surface-area silica, such as silica gel. By proper control of such operating conditions as temperature and the rate at which the diphenylamine is introduced into the reaction zone, it is possible to control the process so as to yield substantial quantities of carbazole while producing only relatively small quantities of any byproducts. In addition, conducting the reaction in the presence of stream has been found to substantially enhance the cyclodehydrogenation of diphenylamine to produce carbazole. The presence of hydrogen during the reaction helps to maintain catalyst activity. For this purpose, hydrogen may be desirable although better conversions of diphenylamine to carbazole may be obtained in the absence of hydrogen. Steam exhibits an apparently different effect on the cyclodehydrogenation reaction than hydrogen in that the steam produces an almost immediate noticeable improvement in conversion and yield. Hydrogen, on the other hand, shows no immediate advantage, but rather shows its effect by continuous longer periods of high conversion, indicating its ability to prolong the catalyst's activity. If desired, the reaction may be conducted in the presence of mixtures of hydrogen and steam and thus obtain the benefits of the enhancing activity of steam and the catalyst activation of the hydrogen.

In general, the process of this invention is carried out by contacting vaporized diphenylamine with the catalyst, preferably a silica-supported platinum catalyst. The diphenylamine may be brought into contact with the catalyst by passing a stream of gas through the diphenylamine heated above its melting point. The stream of gas passing through the heated diphenylamine serves as a carrier for the diphenylamine to bring the diphenylamine into the reaction zone for contact with the catalysts at elevated temperatures. The gas for this purpose may be an inert gas such as nitrogen, or conveniently, steam, hydrogen or mixtures thereof may also be utilized as a carrier means since they may otherwise advantageously be present in the reaction zone. In addition, vaporized diphenylamine may be introduced independently into the reaction zone without the aid of a carrier gas. The carbazole produced is collected in any convenient manner, such as by condensation at the output of the reaction vessel. The carbazole is recoverable from the reaction product by any of several techniques, such as crystallization, sublimation, and extraction. Thus, pure carbazole may easily be isolated by simple separation techniques from any by-products formed, which include benzene, aniline, and ammonia. Thus, in the synthetic dye industry, for example, pure carbazole is made available, the use of which obviates disadvantages of the characteristically impure carbazole derived from anthracene wastes. The unconverted diphenylamine recovered from the reaction products may be recycled to the reaction zone.

In addition to the carbazole and unconverted diphenylamine, benzene, aniline, and ammonia have been identified as by-products of the reaction. It is a discovery of this invention that the formation of the by-products, such as benzene, may be maintained at a minimum at maximum conversion and yield of the diphenylamine to carbazole. Applicant has discovered that at elevated temperatures at about 375° C. and above, carbazole is produced in greater amounts than the by-products. The reaction preferably is conducted at temperatures at above about 450° C. and, ordinarily, the reaction need not be conducted at temperatures in excess of about 570° C. At about 375° C. and above this process begins to yield increasing amounts of carbazole with decreasing amounts of by-products. This is surprising because apparently at least two reactions occur—one is the cyclodehydrogenation of the diphenylamine, and the other is a hydrogenolysis reaction, the latter producing benzene. Unexpectedly, the results indicate that the cyclodehydrogenation reaction occurs in preference to the hydrogenolysis reaction at temperatures above about 375° C. Furthermore, it was thought that the presence of the silica or alumina components in the catalyst would promote the formation of such by-products as benzene from the diphenylamine starting material. Instead, the amount of benzene actually produced decreases.

The percent conversion is the yield of carbazole calculated on the basis of the total amount of diphenylamine introduced into the reaction zone. The percent yield, on the other hand, is the yield of carbazole calculated on the basis of the net amount of diphenylamine used in the system. The net amount of diphenylamine is the amount of diphenylamine introduced into the reaction zone less the amount of unconverted diphenylamine emerging from the reaction zone. Whether the process is conducted as a cyclic operation with recycling of the recovered unconverted diphenylamine or as a batch operation without recycling, it is desirable to correlate high conversion with high yield. High correlation between conversion and yield at these operating temperatures may be obtained by controlling the rate at which the diphenylamine is fed into the reaction zone for contact with the catalyst. As will be illustrated in the case of a platinum on silica gel catalyst containing about 0.6 percent platinum by weight, best correlations between conversion and yield are obtained at weight hourly space velocities not exceeding about 0.3. The weight hourly space velocity is the ratio of the parts by weight of diphenylamine per hour introduced into the reaction zone per parts by weight of catalyst. If the weight hourly space velocity exceeds about 0.3 with such catalysts, the percent conversion per pass decreases, although the percent yield may remain substantially the same. Weight hourly space velocities of less than 0.3 do not appear to have any substantial effect upon conversion and yield. Thus, in a cyclic operation, if the weight hourly space velocity is excessive, the greater are the number of passes required with the unconverted diphenylamine to obtain high yield.

Periodically, as the activity of the catalyst decreases, the catalyst may be regenerated by exposing the catalyst to air or oxygen at elevated temperatures. The regeneration may be conducted at the same temperatures at which the cyclodehydrogenation reaction is conducted. After each regeneration period, air or oxygen is purged from the reaction zone so that the cyclodehydrogenation reaction is conducted in the absence of oxygen, which, if present, in large amounts, interferes with the cyclodehydrogenation reaction.

The figure in the drawings is a graph illustrating the effect of temperatures on the cyclodehydrogenation reaction and the formation of such by-products as benzene. Curve A of the graph shows the percent conversion of the diphenylamine to carbazole over the temperature range indicated. Curve B shows the percent of the diphenylamine converted to benzene over the same temperature range. Curve B is also representative of percent conversion of diphenylamine to aniline in that the percent conversion to aniline also decreases in the same manner as does the percent conversion to benzene. At temperatures below about 370° C., more diphenylamine is converted to benzene than is converted to carbazole. Beginning at temperatures about 375° C. and above more diphenylamine is converted to carbazole than is converted to benzene. Thus, beginning at a temperature of about 375° C. the cyclodehydrogenation reaction surprisingly and favorably occurs in preference to other reactions forming such products as benzene and aniline. Preferably the reaction is conducted at temperatures beginning at about 450° C. and above for the reason that at these higher temperatures the reaction produces maximum or near maximum conversion of diphenylamine to carbazole while producing minimum amounts of such by-products as benzene and aniline. As previously stated, the reaction ordinarily need not be conducted at temperatures in excess of about 570° C. The temperature of 570° C. is not an absolute maximum operating temperature beyond which the reaction does not proceed. As shown by curve A of the graph it is at about temperatures in the neighborhood of 570° C. that the conversion of diphenylamine to carbazole begins to decrease. But even at these temperatures the amount of carbazole produced in relation to the amount of benzene produced is greater than that produced at temperatures in the neighborhood of about 375° C. At elevated temperatures beyond about 570° C. increased charring occurs thus reducing the efficiency of the catalyst and increasing the cost of the process. Therefore, it is preferable not to conduct the process at temperatures much beyond 570° C. Presented with the information set forth herein those skilled in the art will be able to choose the desired maximum operating temperature above 375° C.

The runs represented by the temperature-conversion curves A and B were conducted using 100 grams of a silica-supported platinum catalyst containing 0.6 percent platinum. The runs were conducted in a conventional catalyst tube, the portion of the tube containing the catalyst being the reaction zone. The bulk volume of the catalyst was approximately 115 cc., the depth of the catalyst being about 32 cm. Heated liquid diphenylamine was introduced at one end of the catalyst tube and further heated before entering the reaction zone to volatilize the diphenylamine. Steam, hydrogen, and nitrogen were separately introduced prior to the reaction zone, these gaseous components mixing with the volatilized diphenylamine prior to entry into the reaction zone for contact with the catalyst. The diphenylamine was introduced into the reaction zone at a weight hourly space velocity of 0.1. The rate of nitrogen introduction into the catalyst tube was about 3 ml. (S.T.P.)/gram catalyst/min. The rate of introduction of the hydrogen into the catalyst tube was about 1 ml. (S.T.P.)/gram catalyst/min. The steam was introduced into the catalyst tube in a mole ratio of steam to the diphenylamine of approximately 15. Regeneration at 425° C. preceded each run. The regeneration step consisted initially of purging the catalyst tube with nitrogen for at least 10 minutes. Air in gradually increasing amounts was then introduced into the catalyst tube, until there was 100 percent air with no nitrogen present. The regeneration with 100 percent air was continued for approximately 30 to 50 minutes. This then was followed with another nitrogen purge for about 10 to 20 minutes, and then followed with hydrogen for about 30 to 50 minutes before beginning the introduction of the diphenylamine. A solid reaction material was collected in a flask at the outlet of the catalyst tube. This solid material was extracted with methanol to extract therefrom any products, including unconverted diphenylamine, from the carbazole produced. About 200 cc. of methanol were used for about every 10 grams of diphenylamine fed into the catalyst tube. The insoluble carbazole remaining was then dried and weighed to determine the percent of the diphenylamine converted to carbazole. Since the carbazole is not completely insoluble in the methanol, the percent conversion figures shown in the graph are slightly lower than the actual percent conversion. Benzene was collected in a cold trap through which the gases emerging from the outlet of the product collection flask passed. The benzene was collected and separated from any water which had condensed in the cold trap. The percent conversions for the various temperatures were then calculated and plotted to give the curves in the graph of the drawing.

The beneficial effect of the presence of steam during the cyclodehydrogenation reaction is illustrated in the data of Table I. In addition, the data illustrate the effect of air or oxygen regeneration of the catalyst.

In each of the runs 1 to 9 the amount of the catalyst in the reaction zone of the catalyst tube was 60 grams (bulk volume 70 cc.), the depth of the catalyst bed being 19 centimeters, except in run 1 wherein the depth of the bed was 33 centimeters. The catalyst consisted of 0.6 percent platinum on silica gel. The diphenylamine was heated to about 192±2° C. and introduced into one end of the catalyst tube by means of a stream of nitrogen

Table I

| Run No. | Total Weight Diphenylamine, g. | Average Catalyst Temperature, °C. | Total Carbazole Recovered, g. | Diphenylamine Recovered, g. | $N_2$ flow, ml./min. | Wt., $H_2O$, mg./min. Avg. | Percent Conv. | Percent Yield |
|---|---|---|---|---|---|---|---|---|
| 1 | 25 | 465 | 12.84 | | 160 | | 51 | 51 |
| 2 | 15 | 430 | 5.60 | 5.7 | 160 | | 37 | 60 |
| 3 | 20 | 455 | 7.56 | 8.4 | 160 | | 38 | 65 |
| 4 | 15 | 455 | 9.14 | 3.6 | 160 | 97 | 61 | 80 |
| 5 | 12.5 | 455 | 8.74 | 2.3 | 160 | 83 | [1]70 | [1]88 |
| 6 | 15 | 455 | 9.64 | 4.7 | 160 | 158 | 64 | 93 |
| 7 | 15 | 455 | 9.64 | 3.8 | 160 | 119 | 64 | 86 |
| 8 | 15 | 450 | 7.19 | 7.3 | 160 | 121 | 48 | 93 |
| 9 | 12.5 | 455 | 7.71 | 2.3 | 160 | 111 | 62 | 76 |

[1] These figures are slightly high due to incomplete drying of a portion of the carbazole.

which was passed through the diphenylamine and then into the catalyst tube. The temperature in the reaction zone containing the catalyst was as indicated in the table for each run as the average catalyst temperature. The velocity of the nitrogen stream passing through the diphenylamine feed when maintained at about 160 milliliters per minute delivered the diphenylamine to the catalyst tube at 2.5 grams per hour, as determined by calibration, for a weight hourly space velocity of about 0.04. Runs 1 to 3 were conducted in the presence of nitrogen only as a carrier means for the diphenylamine. In runs 4 to 9, steam also was introduced into the catalyst tube separate from the stream of nitrogen carrying the diphenylamine, resulting in an unexpected increase in the percent yield of carbazole and a corresponding increase in the percent conversion of the diphenylamine. Runs 6 to 9 further illustrate the value of air regenerations. When regeneration is omitted, a serious loss of conversion takes place.

Each of runs 1 to 4 consisted of a series of two-hour reaction periods. Run 5 was a single five-hour reaction period. Run 1 consisted of a series of five consecutive two-hour reaction periods; runs 2 and 4 consisted of a series of three consecutive two-hour reaction periods; and run 3 consisted of a series of four consecutive two-hour reaction periods. In each of runs 1 to 4, the catalyst was protected by nitrogen during the period between each consecutive reaction period of each run. After each reaction period for runs 1–5, the reaction products were collected and taken up with boiling xylene. The carbazole was crystallized and filtered from the solution. The unreacted diphenylamine in the solvent was recovered by distillation. In general, decreasing amounts of carbazole were obtained from each successive reaction period of each individual run indicating loss of catalyst activity. The introduction of steam as in runs 4 and 5 not only appears to help maintain catalyst activity but also enhances the reaction to yield carbazole, as evidenced by the increased yields in these runs.

One of the advantages of the use of catalysts of platinum or palladium supported on silica or alumina or the combination of silica and alumina is that the catalysts may easily be regenerated and permit the use of higher favorable reaction temperatures. The activity of the catalysts decreases upon continued use in this reaction but may be regenerated by contacting the heated catalyst with oxygen. Most simply, regeneration is accomplished by passing air through the catalyst tube and in contact with the catalyst in the reaction zone. After such treatment the catalyst is again ready for use. Runs 6 to 9 summarized in the table illustrate the value of air regeneration, even though steam was present in the reaction zone during the reaction period. Each of these runs was conducted in the same catalyst tube in which the previous runs, 1 to 5, had been conducted wherein the amount of the catalyst in the reaction zone was 60 grams and the depth of the catalyst bed was 19 centimeters. In each of runs 6 to 9, a 5-minute nitrogen purge was used before and after the regeneration period, the nitrogen also being permitted to flow through the tube during the regeneration period.

Runs 6 and 7 each consisted of a series of three consecutive two-hour reaction periods. In run 6, each initial 5-minute nitrogen purge after each 2-hour reaction period was followed with the introduction of air in the catalyst tube in contact with the catalyst at 20 cc./minute for 50-minute regeneration periods. In run 7, each initial 5-minute purge after each 2-hour reaction period was followed with the introduction of air at 40 cc./minute for 30-minute periods. In both runs 6 and 7, the diphenylamine was fed into the reaction zone during each 2-hour reaction period at a rate of feed of about 2.5 grams per hour for a weight hourly spaced velocity of about 0.04.

Run 8 was conducted in the same manner as run 7, except that air was omitted between the 2-hour reaction periods. Instead, only nitrogen and steam were fed into the reaction zones during the periods corresponding to the air intervals of run 7.

Run 9 was conducted in the same manner as run 7, except that the diphenylamine was introduced into the reaction zone during five consecutive one-hour reaction periods alternated with 20-minute regeneration periods at an air flow of 40 cc./minute.

The data of Table II illustrate the effect of variations in the weight hourly space velocity of the diphenylamine fed into the reaction zone with a 0.6 percent platinum on silica gel catalyst. At weight hourly space velocities greater than 0.3, the percent conversion of diphenylamine to carbazole begins to decrease.

Table II

| Run | WHSV[1] | $N_2$ Flow, ml./min. | $H_2$ Flow, ml./min. | Wt. $H_2O$, mg./min. | Percent Conversion | |
|---|---|---|---|---|---|---|
| | | | | | Carbazole | Benzene |
| A | 0.10 | 315 | 75 | 305 | 58.8 | 13 |
| B | 0.16 | 283 | 75 | 305 | 60.0 | 11 |
| C | 0.24 | 283 | 75 | 305 | 58.6 | 11 |
| D | 0.30 | 283 | 75 | 305 | 60.9 | 10 |
| E | 0.31 | 283 | 75 | 305 | 62.6 | 10 |
| F | 0.42 | 283 | 75 | 260 | 56.5 | 10 |
| G | 0.66 | 172 | 75 | 283 | 53.7 | 7 |
| H | 0.85 | 172 | 80 | 283 | 49.2 | 10 |
| I | 0.30 | | 75 | 310 | 60.2 | 9 |

[1] Weight hourly space velocity.

Each of the runs of Table II was conducted using 100 grams of the catalyst having a bulk volume of approximately 115 cc., the depth of the catalyst being about 32 cm. Heated liquid diphenylamine was introduced at one end of the catalyst tube and further heated to its vapor state before introduction into the reaction zone. Steam, hydrogen and nitrogen were separately introduced prior to the reaction zone at the rates shown in Table II. In run I no nitrogen was present. The average temperature of the reaction for each of the runs was 500° C. The carbazole was collected in a flask at the outlet of the catalyst tube and extracted with methanol and then dried and weighed. Benzene was collected in a cold trap as previously described. The percent conversions for these runs of various weight hourly space velocities of diphenylamine are shown in Table II.

The amount of steam in the presence of which the cyclodehydrogenation reaction may be conducted need not be closely controlled. The reaction has been carried out with a steam-diphenylamine mole ratio as high as 35. In commercial operation, it is, of course, desirable to use as small an amount of steam as is necessary to obtain the beneficiating influence of steam on the cyclodehydrogenation reaction. Ordinarily, a noticeable improvement in the yield of carbazole may be obtained with from about 5 to 15 mole of steam per mole of diphenylamine. Hydrogen in small amounts is desirable since it is useful in prolonging the life of the catalyst. However, substantial amounts of hydrogen should not be used, for the reason that hydrogen is also one of the products of the reaction in the cyclodehydrogenation of diphenylamine, and, therefore, would depress the reaction and also contribute to the hydrogenolysis of diphenylamine to yield benzene and ammonia if present in excessively large amounts. Generally, the use of higher temperatures within the range of temperature specified permits the use of larger amounts of hydrogen, but ordinarily the amount of hydrogen need not exceed about 2 moles per mole of diphenylamine.

The catalyst of platinum on silica appears to be the most effective catalyst of the group consisting of platinum or palladium supported on a component selected from silica, alumina, or mixtures thereof. The catalysts containing alumina produce somewhat lower conversions and yields of carbazole. On the other hand, the alumina-containing catalysts respond to the air- or oxygen-regeneration period more quickly and effectively than the silica-containing catalysts. The catalysts containing palladium whether supported on silica or alumina, or mixtures thereof, display catalytic activity comparable to the platinum catalysts.

The above description of this process and the data represented herein are intended as illustrative of the invention, and not restrictive thereof otherwise than as set forth in the appended claims.

What is claimed is:

1. The method of catalytically cyclodehydrogenating diphenylamine to yield carbazole which comprises introducing vaporized diphenylamine to a reaction zone in the absence of air or oxygen and in the presence of a catalyst selected from the group consisting of platinum and palladium supported on a component selected from the group consisting of silica, alumina, and mixtures thereof, whereby two competing reactions of cyclodehydrogenation and hydrogenolysis of the diphenylamine occur in said reaction zone, maintaining said reaction zone at an elevated temperature of not less than about 375° C. to promote the cyclodehydrogenation reaction for conversion of diphenylamine to carbazole in preference to the hydrogenolysis reaction, and recovering the carbazole thus formed.

2. The method defined in claim 1 and further characterized in that steam is maintained in said reaction zone for enhancing the activity of said catalyst.

3. The method defined in claim 1 and further characterized in that hydrogen is maintained in said reaction zone for prolonging the activity of said catalyst.

4. The method defined in claim 1 and further characterized in that the catalytic reaction of said vaporized diphenylamine in said reaction zone is conducted in the presence of a mixture of steam and hydrogen.

5. The method defined in claim 1 and further characterized in that said vaporized diphenylamine is introduced to said reaction zone at a weight hourly space velocity not exceeding about 0.3.

References Cited in the file of this patent

UNITED STATES PATENTS

| 2,636,863 | Haensel | Apr. 28, 1953 |
| 2,664,404 | Blatz | Dec. 29, 1953 |
| 2,692,240 | Sprauer | Oct. 19, 1954 |

FOREIGN PATENTS

| 168,291 | Germany | Mar. 15, 1906 |

OTHER REFERENCES

Graebe: Ber. Deut. Chem., vol. 5, p. 377 (1872).
Zelinsky et al.: Ber. Deut. Chem., vol. 59, pp. 2590–2593 (1926).